(12) United States Patent
Mason et al.

(10) Patent No.: US 6,645,457 B2
(45) Date of Patent: Nov. 11, 2003

(54) METHOD OF GENERATING AQUEOUS CHLORINE DIOXIDE

(75) Inventors: John Y. Mason, Odessa, TX (US); Gary W. Kielman, Granite Bay, CA (US); William R. Griffin, Odessa, TX (US); Dorman N. Mitchim, Rocklin, CA (US)

(73) Assignee: Sabre Oxidation Technologies, Inc., Odessa, TX (US)

( * ) Notice: Subject to any disclaimer, the term of this patent is extended or adjusted under 35 U.S.C. 154(b) by 0 days.

(21) Appl. No.: 10/274,932

(22) Filed: Oct. 21, 2002

(65) Prior Publication Data

US 2003/0091497 A1 May 15, 2003

Related U.S. Application Data

(62) Division of application No. 09/637,798, filed on Aug. 11, 2000, now Pat. No. 6,468,479.

(51) Int. Cl.[7] ............................................. C01B 11/02
(52) U.S. Cl. ..................................................... 423/477
(58) Field of Search ................................. 403/477, 478; 422/120, 122, 305, 187, 129

(56) References Cited

U.S. PATENT DOCUMENTS

| | | | | | |
|---|---|---|---|---|---|
| 4,013,761 A | * | 3/1977 | Ward et al. | ................. | 423/477 |
| 4,250,144 A | * | 2/1981 | Ratigan | ...................... | 422/112 |
| 4,590,057 A | * | 5/1986 | Hicks | ......................... | 423/477 |
| 5,204,081 A | * | 4/1993 | Mason et al. | ............... | 423/478 |

* cited by examiner

Primary Examiner—Ngoc-Yen Nguyen
(74) Attorney, Agent, or Firm—R. L. Graham

(57) ABSTRACT

A solid-state chlorine dioxide generator for generating an aqueous solution of $ClO_2$ is formed within a block comprising an eductor for establishing a vacuum pressure and a reaction column for producing $ClO_2$ from precursor chemicals. The eductor has a water stream flowing therethrough which establishes a vacuum pressure and draws the $ClO_2$ from the reaction column into the water stream to form an aqueous $ClO_2$ solution. The reaction chamber comprises a novel transition zone of increasing flow area wherein the precursor chemicals thoroughly mix resulting in conversion efficiencies of precursors into $ClO_2$ of 95% and above.

10 Claims, 1 Drawing Sheet

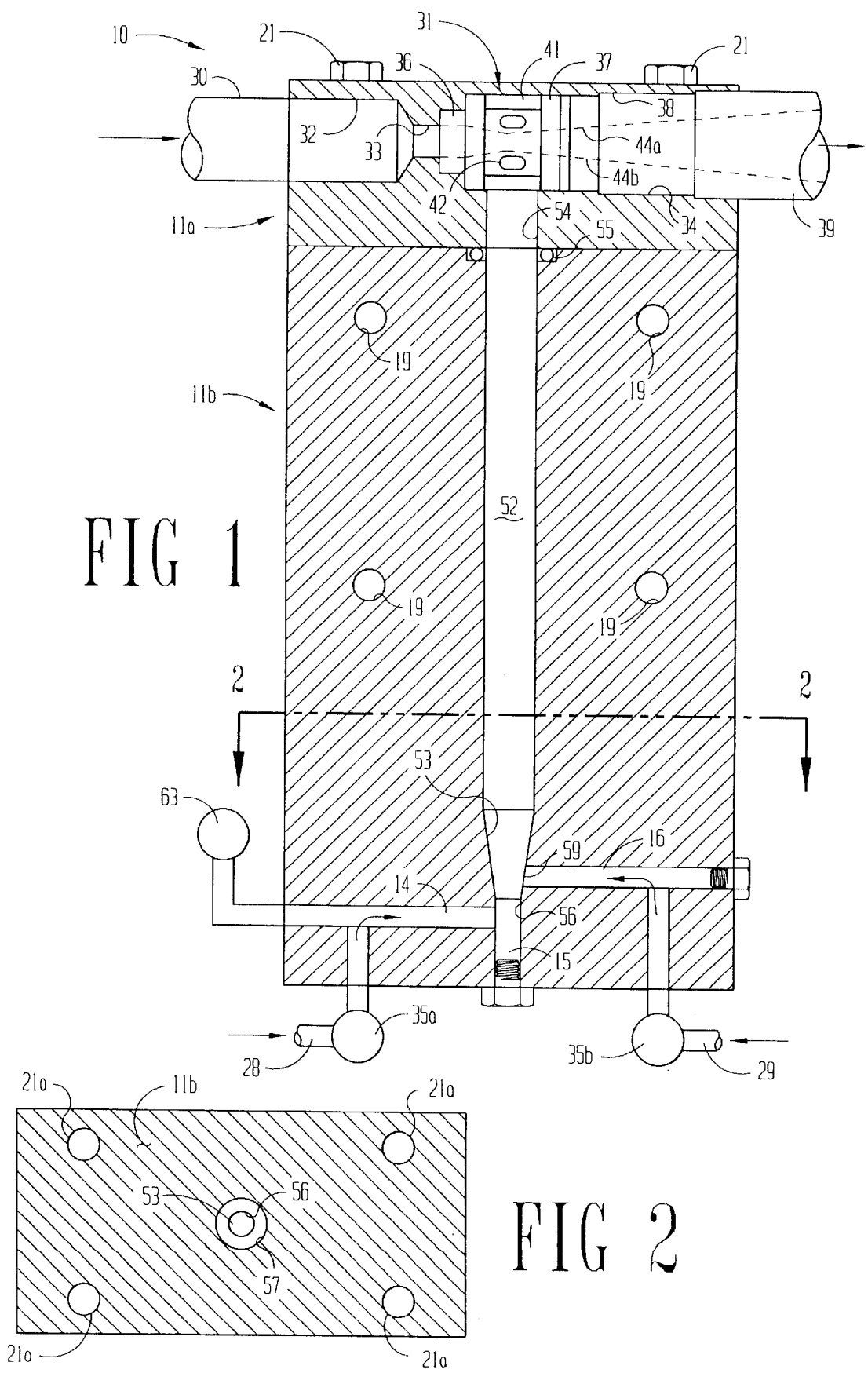

METHOD OF GENERATING AQUEOUS CHLORINE DIOXIDE

CROSS REFERENCE TO RELATED APPLICATION

This is a division of U.S. application Ser. No. 09/637,798, filed Aug. 11, 2000, now U.S. Pat. No. 6,468,479, issue date of Oct. 22, 2002.

BACKGROUND OF THE INVENTION

This invention relates generally to an apparatus for generating chlorine dioxide. In one aspect, it relates to a solid-state chlorine dioxide generator. In another aspect, it relates to a chlorine dioxide generator featuring a novel reaction column which provides exceptional reaction efficiency and allows the generator to operate over a wide range of production rates.

Chlorine dioxide ($ClO_2$) is a strong oxidizing agent and is used in a variety of industrial applications including municipal water treatment as a bactericide, taste and odor control, and zebra mussel infestation control, to name a few. $ClO_2$ is a powerful viricide, bactericide, protocide, and algaecide. In addition, $ClO_2$ does not form THM's (trihalomethane) which is a carcinogen. $ClO_2$ can be prepared by oxidation of chlorites or reduction of chlorates. In a preferred embodiment, the generator of the present invention is a vacuum-driven sodium chlorite ($NaClO_2$)/chlorine ($Cl_2$) reactor. The $Cl_2$ may be used directly or it may be formed by the reaction of HCl and sodium hypochlorite.

At normal operating pressures and temperatures, $ClO_2$ is a gas and is extremely explosive (above about 300 mm Hg pressure $ClO_2$ may detonate). Because of its explosiveness, $ClO_2$ is usually generated under a vacuum and dissolved in water for use. $ClO_2$ is unstable chemically and thus cannot be shipped; it must be generated on site.

A number of vacuum-driven $ClO_2$ generators are commercially available. Vulcan Chemical Co. (formerly Rio Linda Chemical Co.) markets a $ClO_2$ generator under the trade designation "WM-Series". This generator is similar to the generator disclosed in. U.S. Pat. No. 4,590,057. As seen in FIGS. 1 and 2 of U.S. Pat. No. 4,590,057, the Vulcan generator is an assembly of pieces of tubing interconnected by fittings, couplings, elbows, external valves and the like. These components are secured to a relatively large mounting board or surface. The several connections required present sources of pressure and vacuum leaks which could result in poor performance and conversion efficiency. Other disadvantages include higher maintenance and increased space requirements for installing the generator at the industrial site. The conversion efficiency is defined as the ratio of the actual amount (mass) of $ClO_2$ produced to the theoretical limit for a given amount of reactants (see Equation (1) below).

As described in detail below, the preferred generator of the present invention is a solid-state generator with feed lines and check valves bored into and incorporated in a solid block. The present generator has low maintenance and is compact requiring a small installation area.

The prior art vacuum $ClO_2$ generators all have a reaction column where the reactants are brought together and react to form $ClO_2$. The Vulcan generator employs a reaction column filled with particulate packing to enhance mixing of the reactants in the reaction column. Without the packing, the reactants may by-bass one another within the reaction column and thereby reduce efficiency. The use of packing is objectionable because i) it causes a pressure drop across the reaction column which limits throughput, and ii) it may become clogged over time requiring shutdown of the generator for replacing and/or cleaning the packing and reaction column.

SUMMARY OF THE INVENTION

The present invention provides a vacuum-driven $ClO_2$ generator that i) has solid-state construction and/or ii) employs a novel "tuned" reaction column that does not require a packing material and yields excellent $ClO_2$ production efficiency.

The present generator comprises a body having formed therein a tuned reaction column wherein the reactants combine to form $ClO_2$ gas, an eductor connected to the reaction column for dissolving the $ClO_2$ gas in a water stream to form an aqueous $ClO_2$ solution, and a discharge line for discharging the solution. The reactant inlets, reaction column, eductor, and discharge are preferably interconnected through passages bored or machined in the body thereby eliminating the assortment of hardware (i.e. fittings, elbows, etc.) used in prior art designs. The solid-state design of the present generator eliminates pressure and vacuum leaks, reduces maintenance, and reduces the overall size of the generator for convenient installation on site.

The preferred reactants are an aqueous solution of sodium chlorite ($NaClO_2$) and chlorine gas ($Cl_2$). Other reactants such as HCl and NaOCl (to generate $Cl_2$), may also be used. The eductor comprises a suction chamber which is fluid communication with the reaction column. Suction pressure is established in the chamber using a water nozzle wherein the water velocity increases while the pressure decreases (according to Bernoulli's principle) thereby creating a suction pressure. The suction draws the reactants through the generator inlets and into the reaction column wherein the conversion of the reactants to $ClO_2$ occurs almost instantaneously. The $ClO_2$ gas is then sucked into the water stream where it dissolves to form an aqueous solution of $ClO_2$. The concentration of the chlorine dioxide aqueous solution is controlled by controlling the reactant flow rates into the generator. The present generator is capable of producing an aqueous chlorine dioxide having a concentration in the range of 200 to 3300 mg/liter.

In this reaction, each mole of $Cl_2$ gas consumed yields two moles of $ClO_2$ gas product (see Equation (1) below). Thus the products of the reaction will have a larger volume (approximately two times or more) than the reactants. The reaction column is "tuned" to accommodate this increase in volume by providing a segment of increasing flow area in the form of a flow expander (i.e. a diffuser) wherein the increasing flow area in the direction of flow i) accommodates the increase in gas volume, ii) maintains the reactants at nearly constant velocity whereby one reactant will not flow past another unreacted, and iii) induces some turbulent mixing which acts to promote the reaction. This tuning has the effect of allowing the reactants to thoroughly mix thereby improving the conversion efficiency of the generator.

By the time the flow reaches the outlet of the diffuser segment of the reaction column, the reaction is complete and the volume of the products thereafter remains constant. The diffuser segment discharges the products ($ClO_2$ and NaCl) into a cylindrical column of constant flow area wherein the velocity of the $ClO_2$ gas is virtually constant. This insures a steady constant velocity flow of $ClO_2$ into the eductor wherein the $ClO_2$ is dissolved in water forming an aqueous ClO$_2$ solution. The tuned reaction column allows the unit to operate efficiently at lower ClO$_2$ production rates without variations in meter readings and with a greater "turndown" ratio. ClO$_2$ is generated at a minimum of 95% efficiency with no more than 5% excess Cl$_2$ and/or NaClO$_2$. The ClO$_2$ solution is discharged from the generator outlet and conducted by tubing to the point of application.

The turndown ratio is defined as the percent of maximum ClO$_2$ production rate. For example, a generator having a maximum production rate of 500 lbs of ClO$_2$ per day, operating at a rate of 50 lbs ClO$_2$ per day would have a 10% turndown ratio. The present generator has been shown to provide excellent conversion efficiency at turndown ratios as low as 10%. Prior art generators are limited to turndown ratios of about 30% and above. At ratios below 30%, these generators exhibit degradation in conversion efficiency due to inadequate mixing of reactants. Poor conversion efficiencies can lead to uncertainties in the ClO$_2$ production rate and ClO$_2$ concentration levels in the applied aqueous solution.

BRIEF DESCRIPTION OF THE DRAWINGS

FIG. 1 is a schematic of the present solid-state chlorine dioxide generator, shown in longitudinal section.

FIG. 2 is a horizontal sectional view of the generator shown in FIG. 1 with the cutting plane taken along line 2—2.

DESCRIPTION OF THE PREFERRED EMBODIMENTS

With reference to FIG. 1, chlorine dioxide generator 10 comprises eductor block 11a bolted to reaction zone block 11b by bolts 21, which extend through block 11a and are threaded to holes 21a in block 11b (see FIG. 2). Block 11a houses eductor 31 and block 11b houses the mixing column and reactor passages. Water flows through the eductor 31 sucking the reaction product (ClO$_2$) into the water stream which forms an aqueous solution ClO$_2$. The solution is discharged from the generator and piped to a place of use.

Block 11b has formed therein a reaction column 52 fed by three flow passages 14, 15, and 16. In the embodiment shown in FIG. 1, only two passages 14 and 16 are used. A pressure gauge 63 may be connected to one or all the flow passages 14, 15 and 16. Flow passages 14 and 16 are connected to metering valve 35a and 35b to control the flow of the reactants to the reaction column 52. Check valves (not shown) may also be provided in the inlet lines to passages 14, 15, and 16.

Reaction column 52 includes (a) lower transition zone 53 which registers with passage 15 and tapers outwardly in the direction of flow and (b) an upper end which registers with passage 54 formed body 11a. An O-ring 55 provides a seal around the reaction column 52 at the juncture of blocks 11a and 11b.

The transition zone 53 has a lower minimum flow area inlet 56 and a maximum flow area outlet 57. The minimum flow area of the inlet 56 may be equal to that of passage 14 or 15 (if used), and the maximum flow area outlet 57 may be equal to the upper portion of reaction column 52. As shown in FIG. 2, the column 52 and transition zone 53 may be concentric flow from passages 14 and 15 (if used) enter the reaction column at a point below the minimum flow area inlet 56, and flow through passage 16 enters the transition zone 53 at a lower side portion 59 thereof, slightly above the minimum flow area inlet 56. As the reactants mix in the transition zone 53, they flow upwardly in an ever-increasing flow area. The transition zone 53 is shaped to maintain a generally constant flow velocity therethrough. Preferably the zone 53 is generally a circular frustum, but may be any smooth transition shape to effect an ever-increasing flow area therethrough.

The passages formed in block 11b may be bored in a solid metal body or the block 11b may be formed in two halves (bolted together through holes 19) to facilitate machining the required passages, resulting in a solid-state generator, thereby eliminating the numerous interconnected components (e.g., tubing, elbows, fittings, valves, etc.) used in prior art generators. The interior surface of the block half which mates with block 11b will be a mirror image of that illustrated.

The eductor 31 is mounted in eductor block 11a and serves to establish the vacuum pressure required to operate the generator. Block 11a has an inlet bore or passage 32 formed therein which reduces to restriction 33. The eductor 31 is shaped to fit into complementary shaped bore sections, one shown as 34.

The eductor 31 comprises (from left to right as viewed in FIG. 1) a nozzle 36 which has formed therein an orifice of small diameter, a hollow spoof section 37, a hollow threaded section 38 threaded to the body 11a and a hollow full opening section 39. The eductor 31 thus defines an opening longitudinally therethrough for conduction of water. The spool section 37 fits into complementary shaped bore and therewith defines annular passage 41. Holes 42 spaced around spool section 37 communicate with the longitudinal opening of the eductor 31 for conducting the reacted ClO$_2$ from the reaction column into the eductor.

Water delivered to the block 11a through line 30 flows through bore 32 including restriction 33 thereof, and through the eductor 31. Dotted lines 44a and 44b illustrate the flow pattern. Note the orifice of nozzle 36 causes the velocity to increase in the region of openings or holes 42. Downstream flow expands to the full diameter of section 39. Section 39 is connected to a discharge line which delivers an aqueous solution of ClO$_2$ to the system for use. The eductor 31 is a commercially available item from Fischer and Porter, and other manufacturers. Moreover, it can readily be machined by those skilled in the art.

Operation

The block 11a is bored or machined to receive the eductor assembly 31.

As water is flowed from line 30 through the eductor 31, precursor chemicals (reactants) enter the generator through lines 28 and 29 and flow through precision metering valves 35a and 35b. Valves 35a and 35b are adjusted to yield the desired flow rates of reactants. Meters (not shown) may be used to indicate the desired ratio. The reactant flow rates will be determined by the desired production rate of ClO$_2$ solution. The concentration of the aqueous chlorine dioxide solution is controlled by controlling the reactant flow rates into the generator. The present generator is capable of producing an aqueous chlorine dioxide having a concentration in the range of 200 to 3300 mg/l.

The preferred reactants are sodium chlorite (Na ClO$_2$) entering block 11b through valve 35b in an aqueous solution of approximately 25% concentration, and chlorine gas (Cl$_2$) entering through valve 35a. The use of other reactants is possible including sodium hypochlorite and HCl.

Water flow through the eductor 31 creates a vacuum (in accordance with the well-known Bernoulli Principle) in the region in side the spool section 37 and annular passage 41, sucking the reactants up the column 52, including zone 53. By the time the reactants reach the eductor 31, they have reacted, formed $ClO_2$ upon contacting the water stream is dissolved or dispersed therein.

For clarity, the discussion below assumes that the reactants are the preferred reactants comprising an aqueous solution of about 25% sodium chlorite ($NaClO_2$) and chlorine gas ($Cl_2$). As noted above, however, the use of other reactants is possible. The ideal reaction is given by $$NaClO_2 + Cl_2 \rightarrow 2ClO_2(g) + NaCl \qquad (1)$$

Thus it can be seen that for each mole of $Cl_2$ reactant consumed, two moles of $ClO_2$ gas are produced. The effect is that the volume of gas in the products is approximately twice that of the reactants. It is an object of the present tuned reaction column 53 to accommodate the increase volume in a way that causes the reactants to mix properly thereby improving production efficiencies.

An aqueous solution of $NaClO_2$ is drawn under vacuum into block 11b through metering valve 35b. The solution flows through passage 16 and into a lower section 59 of transition zone 53. Simultaneously, gaseous $Cl_2$ is drawn under vacuum through metering valve 35a and flows through passage 14 and upwardly through transition zone 53. The $NaClO_2$ and $Cl_2$ mix and expand transition zone 53 and the reaction according to Equation (1) occurs. The reaction is virtually instantaneous and therefore there is an immediate increase in the volume of the flow as has been described in relation to Equation (1). Flow expander (i.e., transition zone 53) is designed so that as the reacting flow proceeds upwards, the flow area increases in proportion to the flow volume whereby the flow velocity remains approximately constant. The ratio of the flow area of the outlet (maximum area) to the inlet of transition zone 53 should ideally be about 2:1, but a wider ratio bay be used. This ensures that the reactants have sufficient time to mix properly to obtain good reaction efficiency. Also transition zone 53 induces some turbulent mixing which also improves the reaction efficiency. At the outlet of the transition zone 57 (i.e., position of maximum flow area) the reaction is complete and the flow transitions to constant flow area column 52. The velocity in column 52 remains constant up to vacuum region of annular passage 41 thereby providing a steady feed of $ClO_2$ gas into the chamber. The $ClO_2$ is drawn under vacuum into eductor 31 through holes 42 and becomes dissolved in the water flowing therein. An aqueous solution of $ClO_2$ flows through eductor 31 in an expanding flow pattern (indicated by lines 44a and 44b) and is discharged into section 39 and downstream for application. The production rate refers to the rate of production of the $ClO_2$ aqueous solution usually expressed in lbs/day. The ratio of the area of outlet 57 (max) to the area of inlet 56 (min) will be between 3:1 and 1.5:1, preferably between 1.8:1 to 2.9:1, and most preferably between 1.9 and 2.8 to 1.

Without the advantage of the present tuned reaction column (i.e. a constant flow area reaction column as used in prior art generators), as the flow expands the reaction products would accelerate in the reaction column. This creates localized regions where part of the flow may be expanding and moving with higher velocity. This can result in displacement of reactants causing the reactants to flow past one another without reacting thereby degrading performance. In addition this effect limits the "turndown" ratio" at which the generator may be operated. In prior art generators, operation at turndown ratios of about 30% results in a significant reduction in reaction efficiency. In the present tuned reaction generator, it has been found that operation at turndown ratios as low as 10% does not lead to serious degradation in performance. This capability increases the versatility of the generator since it can be operated over a wider range of production rates as dictated by a particular application.

The present generator is pre-calibrated whereby the user specifies a production rate of $ClO_2$, typically in lbs $ClO_2$/day. This rate will vary from application-to-application and will generally fall within the range of 10 to 1000 lbs $ClO_2$/day. The water flow rate is adjusted to provide adequate vacuum pressure to operate the generator. The vacuum pressure is set by gauge 63 and will typically be about 10 to 12 in Hg. Titration measurements have been conducted to calibrate the settings of reactant flow rates as indicated by meters with $ClO_2$ production rates. With reference to these calibration data, the user will adjust valves 33 and 34 to provide the appropriate settings. As has been indicated, tests have shown that the present generator may be operated at turndown ratios of about 10 to 100%.

In an alternative embodiment, the chlorine entering the reaction column 52 (which includes transition zone 53) is generated by reacting NaOCl with HCl. In this embodiment, passage 15 is connected to a metering valve and a precursor feed line in the same manner as passage 14. NaOCl is fed through valve 33 and into passage 14 while HCl is fed into passage 15. The two precursors meet at a location immediately below transition zone 53 and quickly react to form a $Cl_2$ gas. The $Cl_2$ flows upwardly through transition zone and mixes with, and reacts with, $NaClO_2$ forming $ClO_2$ as described above.

Experiment

The generator 10 was provided with eductor 31 having a maximum outside diameter of 2 inches and a nozzle orifice of approximately 0.14 inches.

The reaction block 11b had the following dimensions

| Reaction column Transition zone | 5" |
|---|---|
| Length | 0.75" |
| Max. D (57) | 0.625" |
| Min. D (56) | 0.375" |
| Passages (14, 15 and 16) | 0.375" |

Measurements were taken for three production rates of 340, 100, and 50 lbs. $ClO_2$/day. The suction pressure was set at 11 in. Hg.

Following each test titration analysis was performed to determine the actual ClO2 production rate. The efficiency was calculated by dividing the measured rate by the target production rate. The analysis was done using the current EPA approved method published in Standard Methods for the Treatment of Water and Wastewater and listed as 4500 ClO2-E. The results are summarized below.

| Target Rate (lbs ClO2/day) | Measured Rate (lbs ClO2/day) | Efficiency (%) |
|---|---|---|
| 340 | 322 | 95.5 |
| 100 | 95 | 95 |
| 50 | 50.8 | 101.6 |

In the 50 lbs/day test, the efficiency exceeds 100% which is due to experimental uncertainty. In each case the tests indicate excellent conversion efficiencies. In each test the measured pH of the $ClO_2$ solution was between 5.7 to 5.9.

What is claimed is:

1. A method for producing an aqueous solution of chlorine dioxide comprising
   (a) mixing chlorine in a flow transition zone with sodium chlorite to form chlorine dioxide gas, said zone having an increasing diameter in the flow direction;
   (b) flowing the chlorine dioxide gas through a reaction column;
   (c) bringing the chlorine dioxide gas into contact with a water stream under a vacuum pressure whereby the chlorine dioxide gas is drawn into the water to form a chlorine dioxide aqueous solution.

2. The method of claim 1 wherein the production rate of the aqueous chlorine dioxide solution between 10 and 1000 lbs/day.

3. The method of claim 1 wherein the transition zone has an inlet, an outlet, and a smooth tapered surface interconnecting said inlet and outlet, the ratio of the outlet flow area to the inlet flow area ranging from 1.5:1 to 3:1.

4. The method of claim 1 wherein the transition zone is in the shape of a circular frustum.

5. The method of claim 1 wherein the ratio of the outlet flow area to the inlet flow area of the transition zone ranges from 1.8 to 2.9.

6. The method of claim 1 wherein the concentration of the chlorine dioxide dissolved in the water ranges from 200 to 3300 mg/l.

7. A method of producing an aqueous solution of chlorine dioxide compising:
   (a) flowing water through an eductor;
   (b) mixing reactants of chlorine and sodium chlorite in a reaction column to form chlorine dioxide gas, the reaction column having an increasing flow area in which the reactants react to form the chlorine dioxide gas;
   (c) discharging the chlorine dioxide gas from the reaction column into the eductor wherein the gas and water flowing therethrough mix forming an aqueous solution of chlorine dioxide.

8. The method of claim 7 wherein the flow area of the reaction column increases in the direction of flow by a factor of from 1.5 to 3.0.

9. The method of claim 7 wherein the water and chlorine dioxide mixed in the eductor produces from 10 to 1000 pounds per day of chlorine dioxide.

10. The method of claim 7 wherein the chlorine dioxide and water are mixed to in the eductor to form an aqueous solution of from 200 to 3300 mg./l of chlorine dioxide in the water.

* * * * *